United States Patent
Malluhi et al.

(10) Patent No.: US 11,531,647 B2
(45) Date of Patent: Dec. 20, 2022

(54) DATA STORAGE METHODS AND SYSTEMS

(71) Applicants: Qatar Foundation for Education, Science and Community Development, Doha (QA); Qatar University, Doha (QA)

(72) Inventors: Qutaibah Malluhi, Doha (QA); Naram Mhaisen, Doha (QA)

(73) Assignees: Qatar Foundation for Education, Science and Community Development, Doha (QA); Qatar University, Doha (QA)

( * ) Notice: Subject to any disclaimer, the term of this patent is extended or adjusted under 35 U.S.C. 154(b) by 334 days.

(21) Appl. No.: 16/779,233

(22) Filed: Jan. 31, 2020

(65) Prior Publication Data

US 2020/0250146 A1 Aug. 6, 2020

Related U.S. Application Data

(60) Provisional application No. 62/799,643, filed on Jan. 31, 2019.

(51) Int. Cl.
*G06F 17/30* (2006.01)
*G06F 16/176* (2019.01)
*G06F 16/14* (2019.01)

(52) U.S. Cl.
CPC ........ *G06F 16/1774* (2019.01); *G06F 16/156* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 5,499,253 | A * | 3/1996 | Lary | G06F 11/1076 714/E11.034 |
| 5,579,475 | A | 11/1996 | Blaum et al. | |
| 5,862,158 | A | 1/1999 | Baylor et al. | |
| 6,138,125 | A | 10/2000 | Demoss | |
| 6,148,430 | A | 11/2000 | Weng | |
| 8,639,552 | B1 * | 1/2014 | Chen | G06Q 10/107 705/7.21 |
| 8,712,982 | B2 * | 4/2014 | Holt | G06F 16/9566 707/831 |
| 10,348,810 | B1 * | 7/2019 | Florissi | H04L 67/2833 |

(Continued)

OTHER PUBLICATIONS

Burckhardt, et al. "Cloud Types for Eventual Consistency," LNCS, vol. 7313, 2012, pp. 283-307.

(Continued)

*Primary Examiner* — Hung D Le
(74) *Attorney, Agent, or Firm* — Foley & Lardner LLP

(57) ABSTRACT

Data storage methods and systems for use with multiple cloud storage systems. The methods and systems use passive metadata files which are stored on cloud storage systems to eliminate the risk of a data conflict when data is being written to the multi-cloud storage system. The methods and systems enable a multi-cloud storage system to function safely without data corruption or loss due to potential conflicts. The methods and systems achieve this without the need for a central control server and without the need for the cloud storage systems or the clients to communicate with one another.

20 Claims, 5 Drawing Sheets

(56) References Cited

U.S. PATENT DOCUMENTS

| | | | |
|---|---|---|---|
| 10,372,760 B2* | 8/2019 | Pedapudi | G06F 16/832 |
| 2005/0108371 A1* | 5/2005 | Manion | H04L 67/1048 709/223 |
| 2006/0074954 A1 | 4/2006 | Hartline et al. | |
| 2006/0075954 A1* | 4/2006 | Robinson | B63B 1/20 114/291 |
| 2009/0204718 A1* | 8/2009 | Lawton | G06F 9/5077 711/6 |
| 2010/0199042 A1* | 8/2010 | Bates | H04L 63/0428 711/135 |
| 2012/0047339 A1 | 2/2012 | Decasper et al. | |
| 2013/0110778 A1* | 5/2013 | Taylor | G06F 11/1435 707/624 |
| 2014/0164315 A1* | 6/2014 | Golshan | G06F 16/93 707/608 |
| 2014/0168073 A1* | 6/2014 | Chizeck | G06T 15/405 345/156 |
| 2015/0143501 A1* | 5/2015 | Cherukuri | H04L 63/02 726/11 |
| 2015/0372943 A1* | 12/2015 | Hasan | H04L 45/586 709/226 |
| 2016/0105488 A1* | 4/2016 | Thakkar | G06F 9/45558 709/217 |
| 2017/0272209 A1 | 9/2017 | Yanovsky et al. | |
| 2017/0364345 A1* | 12/2017 | Fontoura | G06F 8/65 |
| 2018/0083835 A1* | 3/2018 | Cole | H04L 41/0246 |
| 2019/0138430 A1* | 5/2019 | Smiljanic | G06F 11/362 |
| 2019/0238590 A1* | 8/2019 | Talukdar | G06F 3/0631 |
| 2019/0363895 A1* | 11/2019 | Barr, III | H04L 67/2842 |
| 2019/0370362 A1* | 12/2019 | Mainali | G06F 16/116 |
| 2020/0034548 A1* | 1/2020 | Wu | H04L 63/0823 |
| 2021/0012538 A1* | 1/2021 | Wang | G06T 17/05 |

OTHER PUBLICATIONS

Chen, et al., "NCCloud: A Network-Coding-Based Storage System in a Cloud-of-Clouds", IEEE Trans. Computers, vol. 63, No. 1, pp. 31-44, Jan. 2014.

Dobre, et al., "Hybris: Robust Hybrid Cloud Storage", In Proc. of ACM SoCC, 2014, pp. 1-14.

Han, et al., "MetaSync: File Synchronization Across Multiple Untrusted Storage Services", In Proc. of USENIX Annual Technical Conf., 2015, pp. 83-95.

Jaatun, et al., "The design of a redundant array of independent net-storages for improved confidentiality in cloud computing", Journal of Cloud Computing [Online], 1(13). Available: https://link.springer.com/article/10.1186/2192-113X-1-13.

Lejeune, et al., "Service Level Agreement for Distributed Mutual Exclusion in Cloud Computing", In Proc. Of IEEE/ACM Intl. Symp. on CCGrid, 2012, pp. 180-187.

Li, et al., "A Secure and Reliable Hybrid model for Cloud-of-Clouds Storage Systems", 2016 IEEE 22nd International Conference on Parallel and Distributed Systems (ICPADS), Wuhan, 2016, pp. 1157-1162, doi: 10.1109/ICPADS.2016.0152.

Pottier, et al., "TrustyDrive, a Multi-Cloud Storage Service that Protects Your Privacy", 2016 IEEE 9th International Conference on Cloud Computing (CLOUD), San Francisco, CA, 2016, pp. 937-940, doi: 10.1109/CLOUD.2016.0140.

Sampaio, et al., "Uni4Cloud: An Approach based on Open Standards for Deployment and Management of Multi-cloud Applications", In Proc. of the 2nd Intl. Workshop on Software Engineering for Cloud Computing, 2011, pp. 15-21.

Schnjakin, et al., "Evaluation of Cloud-RAID: A Secure and Reliable Storage Above the Clouds", In Proc. IEEE Intl. Conf. on Computer Comm. and Net., 2013, pp. 1-9.

Seo, et al., "Mutual Exclusion Method in Client-Side Aggregation of Cloud Storage", in IEEE Transactions on Consumer Electronics, vol. 63, No. 2, pp. 185-190, May 2017, doi: 10.1109/TCE.2017.014838.

Shen, et al., "SpyStorage: A Highly Reliable Multi-Cloud Storage with Secure and Anonymous Data Sharing", 2017 International Conference on Networking, Architecture, and Storage (NAS), Shenzhen, 2017, pp. 1-6, doi: 10.1109/NAS.2017.8026878.

Song, et al., "SaveMe: Client-Side Aggregation of Cloud Storage", IEEE Trans. Consumer Electronics, vol. 61, No. 3, pp. 302-310, Aug. 2016.

Zhao, et al., "Deliverance from Trust through a Redundant Array of Independent Net-storages in Cloud Computing", In Proc. of IEEE Infocom 2011 Workshop on Cloud Computing, 2011, pp. 631-636.

C. Huang, and L. Xu, "STAR : An Efficient Coding Scheme for Correcting Triple Storage Node Failures," IEEE Transactions on Computers, vol. 57, No. 7, pp. 889-901, Jul. 2008.

C. W. Sung and X. Gong, "A zigzag-decodable code with the mds property for distributed storage systems," in 2013 IEEE International Symposium on Information Theory Proceedings (ISIT). IEEE, 2013, pp. 341-345.

Corbett, Peter et al., Row-Diagonal Parity for Double Disk Failure Correction, Proceedings of the Third USENIX Conference on File and Storage Technologies, Mar. 31-Apr. 2, 2004, 15 Pages.

L. Xu and J. Bruck, "X-Code: MDS Array Codes with Optimal Encoding," IEEE Trans. on Information Theory, pp. 272-276, Jan. 1999.

L. Xu, V. Bohossian, J. Bruck, and D. G. Wagner, "Low-Density MDS Codes and Factors of Complete Graphs," IEEE Trans. on Information Theory, pp. 1817-1826, Sep. 1999.

M. Blaum, "A family of MDS array codes with minimal number of encoding operations," in Proc. IEEE International Symposium on Information Theory, pp. 2784-2788, Jul. 2006.

M. Blaum, J. Brady, J. Bruck, J. Menon, and A. Vardy, "The EVENODD Code and its Generalization: An Efficient Scheme for Tolerating Multiple Disk Failures in RAID Architectures," Chapter 14, High Performance Mass Storage and Parallel I/O, 2002.

Non-Final Office Action on U.S. Appl. No. 16/777,609 dated Jun. 16, 2022.

S. Gollakota and D. Katabi, "Zigzag decoding: combating hidden terminals in wireless networks," in Proc. SIGCOMM, 2008, pp. 159-170.

Y. Wang. "Array BP-XOR codes for reliable cloud storage systems," in Proc. of the 2013 IEEE International Symposium on Information Theory (ISIT), pp. 326-330, Istanbul, Turkey, Jul. 2013.

* cited by examiner

Algorithm 1 Partial Permission
---
Input: *part file name*, part version
Output: partial permission (True or False)
1: lockfile_name= part_file_name + client_ID + ".lock"
2: Attempt to upload lockfile_name
3:    If Failed *Return False*
4: Verify that no other lock files for part_file_name exist
5:    If Failed
6:       Remove lockfile_name
7:       *Return False*
8: Verify that the part version currently on the cloud is older than part_version
9:    If Failed
10:       Remove lockfile_name
11:       *Return False*
12: *Return True*

Figure 4

Algorithm 2 Get Writing Permission

Input: file_name, file_version
Output: writing permission (True or False)
1: Generate part files
2: For each cloud $c_i$:
3:   c_partial_permission = Partial Permission (part_file$_i$, file_version)
4:   If c_partial_permission is False, return False
5: Upload part_file$_i$ to $c_i$
6: Remove lockfile_name

Figure 5

DATA STORAGE METHODS AND SYSTEMS

CROSS-REFERENCE TO RELATED APPLICATIONS

The present application is a non-provisional filing of and claims priority to U.S. Provisional Patent Application 62/799,643, titled "Method for Managing Concurrent Data Modifications in Multi-Cloud Storage Systems" and filed on Jan. 31, 2019, which is incorporated herein by reference in its entirety.

FIELD

The present invention relates to data storage methods and systems. The present invention more particularly relates to methods and systems for storing data across multiple cloud storage systems.

BACKGROUND

With ever-growing amounts of data, users are shifting from local data storage to cloud storage services (e.g. Dropbox™, Google Drive™, etc.). Cloud storage services are convenient since they remove the need to maintain local storage means and they allow data to be accessed from any location and from any device. Data confidentiality and integrity are critical requirement for outsourcing data to third party storage in the cloud. The traditional approaches of relying on a single cloud storage provider fail to meet these critical requirements due to the inevitable risks of privacy, data leaks and service outages. To tackle this issue, various multi-cloud storage systems (also known as cloud of clouds) have been proposed.

As with traditional cloud storage services, multi-cloud storage systems should provide users with the ability to access and modify their files from anywhere. Further, user data should be always synchronized among all of their devices. One of the fundamental synchronization features is the ability to detect data conflicts and maintain data consistency. Data conflicts occur when multiple clients attempt to modify the same file at the same time. Current cloud storage providers, such as Dropbox™ and Google Drive™, are able to detect and solve such data conflicts easily since the providers use centralized points (servers) to receive, coordinate between, and process clients requests. However, such conflict detection is still a challenging task in multi-cloud storage systems due to the following reasons:

Client Side Only:

Secure multi-cloud storage systems are server-less. Hence, there is no central controller to coordinate between clients and detect data conflicts.

Lack of Communication Between Clients:

Cloud storage clients cannot effectively communicate and coordinate between each other (e.g. to reach consensus) since they connect to the service only when they need and they do not know each other.

Lack of Processing Resource:

There is no processing resource on cloud storage providers. They provide only write/read and related features (passive servers). Thus, programs cannot be executed on these servers.

Multiple Destinations:

Since data is distributed among different clouds, one cloud might not experience a conflict while another cloud in the system does.

There is a need for improved data storage methods and systems which seek to alleviate at least some of the problems described herein.

SUMMARY

According to one aspect of the present invention, there is provided a data storage method for storing a data file across a plurality of storage nodes, the method comprising:
  a) partitioning the data file into a plurality of data parts;
  b) selecting a data part of the plurality of data parts;
  c) generating a lock file corresponding to the data part, the lock file comprising an identifier which identifies the data part;
  d) selecting a storage node of the plurality of storage nodes;
  e) sending a lock file query to the storage node, the lock file query requesting the storage node to return a lock file query response which is indicative of whether or not the storage node already stores a lock file comprising an identifier which identifies the data part;
  f) receiving the lock file query response from the storage node and,
    if the lock file query response indicates that the storage node does not already store a lock file comprising an identifier which identifies the data part:
      uploading the lock file to the storage node;
      uploading the data part to the storage node; and
      sending a delete lock file instruction to the storage node to instruct the storage node to delete the lock file; or
    if the lock file query response indicates that the storage node already stores a lock file comprising an identifier which identifies the data part:
      modifying the data part to produce a conflicted data part; and
      uploading the conflicted data part to the storage node; and
  g) repeating b)-f) for each data part of the plurality of data parts until each storage node stores at least one data part or at least one conflicted data part.

In some embodiments, the method comprises: sending a version query to the storage node, the version query requesting the storage node to return a version query response which is indicative of the version of a data part stored by the storage node; and receiving the version query response from the storage node and, if the version query response indicates that the storage node stores a newer version of the data part: modifying the data part to produce a conflicted data part; and uploading the conflicted data part to the storage node.

In some embodiments, each of the plurality of storage nodes is a cloud storage system.

In some embodiments, each cloud storage system is configured to store data without communicating with the other cloud storage systems.

In some embodiments, each cloud storage system is configured to store data without communicating with a central controller.

In some embodiments, the method comprises: uploading a different data part to each storage node; and using an erasure coding technique to encode the data parts that are stored by the storage nodes.

In some embodiments, the method comprises: partitioning the data file into a greater number of data parts than the number of storage nodes; and uploading a group of the data parts to each storage node.

In some embodiments, the method comprises: encrypting each data part using an encryption key; and sending portions of the encryption key to different storage nodes each storage node stores a different portion of the encryption key.

According to another aspect of the present invention, there is provided a data storage system comprising: a client device which incorporates a processor and a memory, the memory storing executable instructions which, when executed by the processor, cause the client device to:

a) partition a data file into a plurality of data parts;
b) select a data part of the plurality of data parts;
c) generate a lock file corresponding to the data part, the lock file comprising an identifier which identifies the data part;
d) select a storage node of a plurality of storage nodes;
e) send a lock file query to the storage node, the lock file query requesting the storage node to return a lock file query response which is indicative of whether or not the storage node already stores a lock file comprising an identifier which identifies the data part;
f) receive the lock file query response from the storage node and,
   if the lock file query response indicates that the storage node does not already store a lock file comprising an identifier which identifies the data part:
      upload the lock file to the storage node;
      upload the data part to the storage node; and
      send a delete lock file instruction to the storage node to instruct the storage node to delete the lock file; or
   if the lock file query response indicates that the storage node already stores a lock file comprising an identifier which identifies the data part:
      modify the data part to produce a conflicted data part; and
      upload the conflicted data part to the storage node; and
g) repeat b)-f) for each data part of the plurality of data parts until each storage node stores at least one data part or at least one conflicted data part.

In some embodiments, the memory stores executable instructions which, when executed by the processor, cause the client device to: send a version query to the storage node, the version query requesting the storage node to return a version query response which is indicative of the version of a data part stored by the storage node; and receive the version query response from the storage node and, if the version query response indicates that the storage node stores an newer version of the data part: modify the data part to produce a conflicted data part; and upload the conflicted data part to the storage node.

In some embodiments, each of the plurality of storage nodes is a cloud storage system.

In some embodiments, each cloud storage system is configured to store data without communicating with the other cloud storage systems.

In some embodiments, each cloud storage system is configured to store data without communicating with a central controller.

In some embodiments, the memory stores executable instructions which, when executed by the processor, cause the client device to: upload a different data part to each storage node; and use an erasure coding technique to encode the data parts that are stored by the storage nodes.

In some embodiments, the memory stores executable instructions which, when executed by the processor, cause the client device to: partition the data file into a greater number of data parts than the number of storage nodes; and upload a group of the data parts to each storage node.

According to another aspect of the present invention, there is provided a computer-readable medium storing executable instructions which, when executed by a computing device, cause the computing device to:

a) partition a data file into a plurality of data parts;
b) select a data part of the plurality of data parts;
c) generate a lock file corresponding to the data part, the lock file comprising an identifier which identifies the data part;
d) select a storage node of a plurality of storage nodes;
e) send a lock file query to the storage node, the lock file query requesting the storage node to return a lock file query response which is indicative of whether or not the storage node already stores a lock file comprising an identifier which identifies the data part;
f) receive the lock file query response from the storage node and,
   if the lock file query response indicates that the storage node does not already store a lock file comprising an identifier which identifies the data part:
      upload the lock file to the storage node;
      upload the data part to the storage node; and
      send a delete lock file instruction to the storage node to instruct the storage node to delete the lock file; or
   if the lock file query response indicates that the storage node already stores a lock file comprising an identifier which identifies the data part:
      modify the data part to produce a conflicted data part; and
      upload the conflicted data part to the storage node; and
g) repeat b)-f) for each data part of the plurality of data parts until each storage node stores at least one data part or at least one conflicted data part.

In some embodiments, the computer-readable medium stores executable instructions which, when executed by a computing device, cause the computing device to: send a version query to the storage node, the version query requesting the storage node to return a version query response which is indicative of the version of a data part stored by the storage node; and receive the version query response from the storage node and, if the version query response indicates that the storage node stores an newer version of the data part: modify the data part to produce a conflicted data part; and upload the conflicted data part to the storage node.

In some embodiments, each of the plurality of storage nodes is a cloud storage system.

In some embodiments, the computer-readable medium stores executable instructions which, when executed by a computing device, cause the computing device to: upload a different data part to each storage node; and use an erasure coding technique to encode the data parts that are stored by the storage nodes.

In some embodiments, the computer-readable medium stores executable instructions which, when executed by a computing device, cause the computing device to: partition the data file into a greater number of data parts than the number of storage nodes; and upload a group of the data parts to each storage node.

BRIEF DESCRIPTION OF THE DRAWINGS

So that the present invention may be more readily understood, embodiments of the present invention will now be described, by way of example, with reference to the accompanying drawings, in which:

FIG. 4 is an algorithm of some embodiments, and

FIG. 5 is an algorithm of some embodiments.

DETAILED DESCRIPTION

Figure 1:
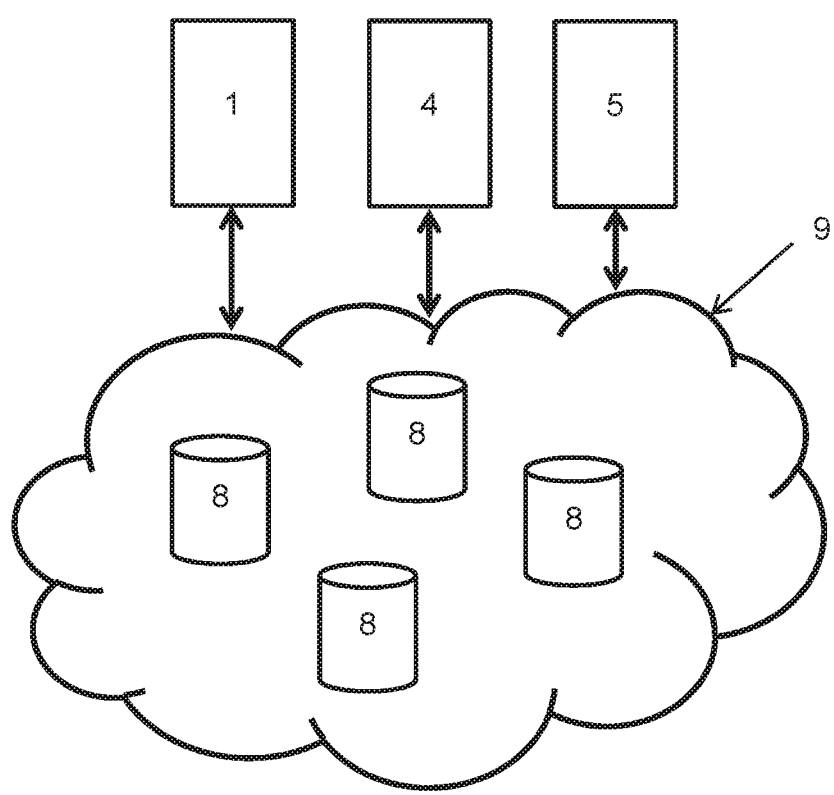
FIG. 1 is a schematic diagram of a storage system of some embodiments.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 2:
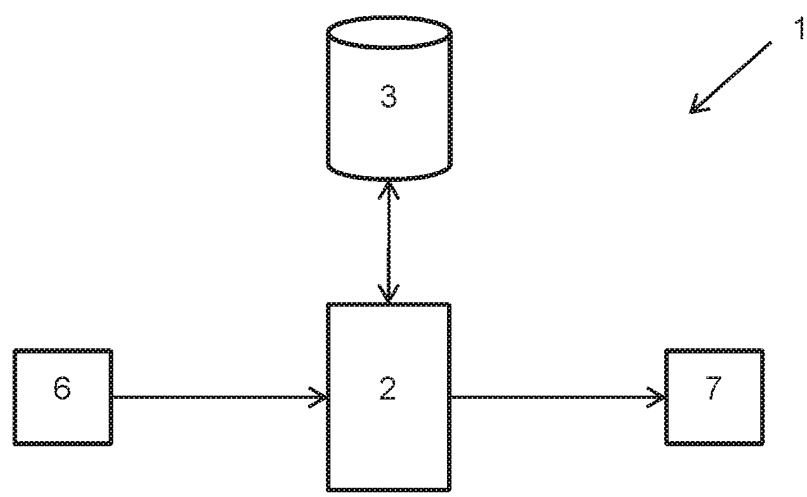
FIG. 2 is a schematic diagram of a client device of some embodiments.

Referring to FIGS. 1 and 2 of the accompanying drawings, a data storage system of some embodiments comprises a client device 1 having a processor 2 and a memory 3. In some embodiments, the system is configured for use with additional client devices 4, 5. Two additional client devices 4, 5 are shown in FIG. 1 but it is to be appreciated that the system of some embodiments is configured for use with any number of client devices. Each client device may be any type of computing device, such as, but not limited to a desktop computer, a laptop computer, a server, a smartphone or a tablet.

For simplicity, the following description will refer to the first client device 1 but it is to be appreciated that the description applies equally to any of the other client devices 4, 5. The client device 1 comprises a data input module 6 which is configured to receive data in the form of a data file or data array and to communicate the data to the processor 2. The processor 2 is configured to execute instructions which are stored in the memory 3 and to process data provided via the data input 6 or other data stored in the memory 3. The client device 1 further comprises a data output module 7 which is configured to output or transmit data from the client device 1.

The client device 1 is configured to communicate with a plurality of storage nodes 8 via a computer network, such as the Internet. In this embodiment, each storage node 8 is a cloud storage system or provider which is accessible via the cloud 9.

As will become clear from the description below, the storage system of some embodiments is configured to store a data file across a plurality of storage nodes 8. Each storage node 8 comprises a data storage system or a multiple data storage systems. For instance, in some embodiments, each storage node comprises a data storage server or multiple data storage servers. In some embodiments, each storage node 8 is a cloud storage system. In some embodiments, the storage nodes 8 are a plurality of cloud storage systems which collectively form a multi-cloud storage system.

A method of some embodiments can be utilized in multi-cloud storage systems in order to provide data consistency and detect any potential data conflicts among users' devices. Such features seek to enhance the usability and reliability of multi-cloud storage systems, making them more secure and more reliable than conventional a single cloud storage system.

The method of some embodiments seeks to provide the following functionality:

The method does not require inter-client or inter-server (storage node) communication The method does not require any central control server (i.e. it functions as a server-less system)

The method utilizes passive cloud storage services

The method is scalable with respect to the number of clouds with only a minor and tolerable additional performance overhead The method is scalable with respect to the number of users with only a minor and tolerable additional performance overhead The systems and methods of some embodiments partition data using innovative coding techniques and then encrypt and distribute it among multiple cloud storage providers. This approach seeks to bring at least some of the following key benefits to cloud storage services:

Data Privacy: Since each part of the data in the system is stored on a separate cloud storage provider, there is no single cloud provider that can retrieve, use, or view the full data of a user. Furthermore, in some embodiments all data parts and metadata are encrypted before they are sent to cloud providers.

System Security: In some embodiments, the system comprises an encryption module which is configured to encrypt at least one of the data blocks of a data array using an encryption key. Unlike conventional mechanisms that store a hash of access credentials on the system, which makes them susceptible to dictionary attacks, in some embodiments the encryption key is stored more securely as a set of password-protected secret shares that are stored on different storage nodes (e.g. different cloud servers). Therefore, a cloud server will have no way of compromising (zero-knowledge about) the encryption secret key. Moreover, these shares are stored in the cloud. Therefore, any clients with right privileges are able to seamlessly construct the key and access the data.

Data Availability: Data replication on multiple cloud storage systems can be used in some embodiments, which enhanced data reliability. In other embodiments, an efficient [d+p, d] erasure code is used such that data is partitioned into d+p parts consisting of d data parts and p parity parts. Even if up to p providers fail or stop to provide the service for any reason, the data can still be retrieved from any remaining d providers, which ensures data availability and reliability of the proposed file system. Erasure codes are much more space effective, cost effective and convenient compared to duplicating all of the data on multiple cloud provider systems. The algorithm of some embodiments seeks to provide these improvements in efficiency and reliability.

The method and system of some embodiments seeks to detect data conflicts resulting from concurrent data modifications by different users in multi-cloud storage systems.

The method of some embodiments will now be described with reference to FIG. 3 of the accompanying drawings. The purpose of the method is to store a data file, which is initially stored or provided by the client device 1, across the plurality of storage nodes 8.

Figure 3:
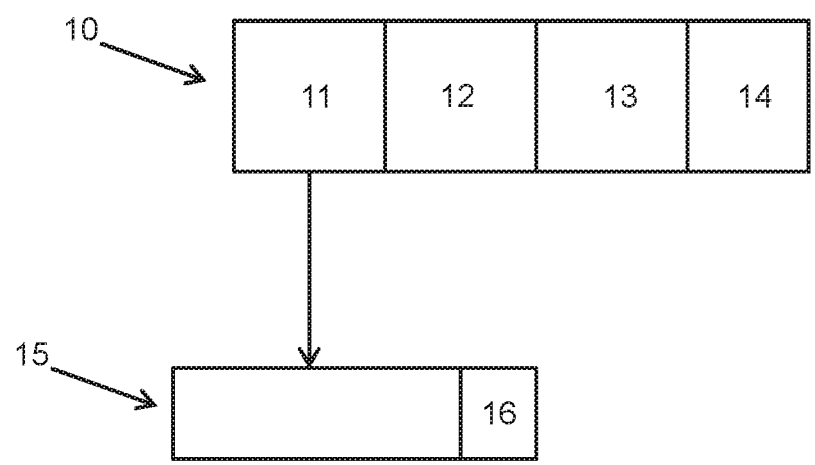
FIG. 3 is a schematic diagram showing a data file being modified with metadata.

Referring to FIG. 3, the method comprises partitioning a data file 10 into a plurality of data parts 11-13. In this example, the method comprises partitioning the data file 8 into three data parts 11-13, but it is to be appreciated that other embodiments partition the data file 10 into a greater or fewer number of data parts. In some embodiments, the data parts are stored on distinct cloud storage nodes or systems.

In some embodiments, the data file 10 is stored with metadata 14. The metadata 14 is either stored as part of the data file 10 or separately from the data file 10 with a link to the data file 10. In some embodiments, the metadata 14 comprises an identifier which identifies the data file 10. In some embodiments, the metadata 14 comprises version metadata which indicates the version of the data file 10.

The method comprises selecting a data part 11 of the plurality of data parts 11-13 and generating a lock file corresponding to the data part. The lock file comprises an identifier which identifies the data part.

The method comprises selecting a storage node 8 of the plurality of storage nodes 8 to store the selected data part 11. In order to avoid completely the risk of a data conflict in the multi-cloud storage system provided by the storage nodes 8, the method and system of some embodiments uses a lock file which is stored on a storage node 8 when the system is in the process of writing data to that storage node 8.

The method comprises sending a lock file query to the storage node 8 which has been selected by the client device 1 to store the data part. The lock file query requests the storage node 8 to return a lock file query response which is indicative of whether or not the storage node 8 already stores a lock file comprising an identifier which identifies the data part 11.

The method comprises receiving a lock file query response from the storage node 8. If the lock file query response indicates that the storage node 8 does not already store a lock file comprising an identifier which identifies the data part 11, the method comprises uploading a lock file generated by the client device 1 to the storage node 8. Once the lock file is stored by the storage node 8, the client device 1 uploads the data part 11 to the storage node 8.

Once the upload of the data part 11 is complete, the client device 1 sends a delete lock file instruction to the storage node 8 to instruct the storage node 8 to delete the lock file. This use of a lock file alerts other client devices to the fact that the client device 1 is uploading a data part 11 to the storage node 8. The lock file thereby avoids a data conflict which might occur if another client device attempts to upload the same data part to the storage node 8 at the same time as the client device 1.

If, on the other hand, the lock file query response indicates that the storage node 8 already stores a lock file comprising an identifier which identifies the data part 11, the client device 1 modifies the data part 11 to produce a conflicted data part. In some embodiments, this modification is a modification to metadata stored with or associated with the data part 11 which effectively labels the data part as a conflicted data part. The client device 1 then uploads the conflicted data part to the storage node 8. This approach minimizes the risk of a deadlock occurring which would otherwise prevent a client device from uploading data to a storage node.

Once the data part 11 or a conflicted data part corresponding to the data part 11 has been uploaded to a storage node 8, the method repeats for the other data parts 12-13 of the data file 10 until each storage node 8 stores at least one data part or at least one conflicted data part. The method stops when all data parts 11-13 of the data file 10 have been uploaded to the storage nodes 8 and hence stored across the storage nodes 8.

In some embodiments, the method comprises labelling the selected data part 11 to produce a labelled data part 15 by adding metadata 16 to the data part, as shown in FIG. 3. In some embodiments, the metadata 16 comprises an identifier which identifies the data file 10. In some embodiments, the metadata 16 comprises version metadata which indicates the version of the data file 10.

In some embodiments, the method comprises sending a version query to the storage node 8 which requests the storage node 8 to return a version query response which is indicative of the version of a data part stored by the storage node 8. The client device 1 receives the version query response from the storage node 8 and, if the version query response indicates that the storage node 8 stores a newer version of the data part, the method comprises modifying the data part to produce a conflicted data part. The client device 1 then uploads the conflicted data parts to the storage node 8.

The use of the lock file by the methods and systems of some embodiments enables the multi-cloud storage system to operate without communicating with a central controller or server. Furthermore, each storage node 8 is not required to communicate with any of the other storage nodes 8.

In some embodiments, the method comprises adding redundancy to the data parts by replicating each data part. In some embodiments, the replicated data parts are stored across a plurality of the storage nodes 8.

In some embodiments, the method comprises encoding a plurality of the data parts 11-13 which are stored across the plurality of storage nodes 8. As part of this encoding process redundant data parts are generated and stored by the plurality of storage nodes 8. In some embodiments, the encoding comprises using an erasure coding technique to encode the data parts 11-13.

In some embodiments, the method comprises partitioning the data file 10 into a greater number of data parts than the number of storage nodes. In this case, the file data is distributed across the storage nodes such that each storage node stores more than one data part. In these embodiments, the encoding technique described above may be applied to groups of the data parts. In some embodiments, the data parts of each group are stored on a respective one of the storage nodes.

In some embodiments, the method further comprises encrypting each data part 11-13 using an encryption key. In some embodiments, the encryption key is divided into portions and different portions of the encryption key are sent to different storage nodes 8 so that each storage node 8 stores a different portion of the encryption key. This has the added benefit of increasing the security of the system by ensuring that no single storage node 8 stores the entire encryption key and hence no storage node 8 is alone capable of decrypting one of the encrypted data parts.

Data Consistency in multi-cloud storage environments

Data consistency in multi-cloud storage systems of some embodiments may be defined as follows: let D be the original file, and $d_n$ the $n^{th}$ part of the encoded file D;

$v_{d_n}$ is the version of the $n^{th}$ data part $d_n$. And $v_D$ is the version of the original file D; and $c_n$ be the $n^{th}$ cloud provider that hosts $d_n$.

The file D is in a consistent state in a multi-cloud storage system if:

1. all data parts, $d_1, d_2, d_3 \ldots$, hosted on the different clouds $c_1, c_2, c_3 \ldots$ were generated from the same original data D;
2. all data parts share the same version: $v_{d1}=v_{d2}=v_{d3}=v_D$, or if a [d+p,d] coding technique is used, then at least d data parts have to be on the same versions; and
3. The versions of all data files $v_{d_1}, v_{d_2}, v_{d_3} \ldots$ are written by a single client by overwriting previous versions $v'_{d_1}, v'_{d_2}, v'_{d_3} \ldots$ where $v'_{d_i} > v_{d_i}$ for any i If any of the above three data consistency rules are violated, a data conflict occurs.

Data Conflict

A data conflict occurs when:

1. Two or more clients attempt to modify the same file simultaneously (competing to write the same version). For example, assuming a file has certain version $v_D$, a data conflict occurs when two clients modify this file, making its version $v_D+1$, on their local machines and they both attempt to write this same version ($v_D+1$) on the cloud. Such cases might lead to data parts being heterogeneous, e.g. $d_1, d_2$ might be coming from user $U_1$ while $d_3$ is coming from user $U_2$.
2. A client attempt to upload a file of version $v_D$ while currently the file is at another version $v'_D$ where $v'_D \geq v_D$. For example, if a client C opens version $v_D=2$ of a file for read only, and in the meantime the file has been modified to version $v'_D=5$ (three modifications). Then, if that client modifies its already loaded version, a data conflict occurs since the client will try to overwrite a more recent version with an older one Methods and systems of some embodiments operate by executing an Algorithm 1, as shown in FIG. 4. This algorithm runs on each storage node in a multi-cloud storage system and deals with the data part hosted on that storage node.

Algorithm 1 comprises three main phases. The first phase is placing a lock file (line 2). The lock file is an indicator that a current part is being uploaded by a specific client. The second phase performs two verifications (line 4 for lock uniqueness, and line 6 for versions). The third phase is lock removal (occurs on line 6, line 10, or line 14).

Method and system of some embodiments operate by executing an Algorithm 2, as shown in FIG. 5. In some embodiments, Algorithm 2 is used in conjunction with Algorithm 1 to permit or deny permission to write to a storage node. Line 2 of Algorithm 2 may be performed by a different thread for each cloud so that the cloud-specific sections all run simultaneously. This significantly improves the performance of the system.

According to Algorithm 2, if all operations resulting from Algorithm 1 are successful, the system grants a user permission to write (upload) the data parts. If, on the other hand, a data conflict has occurred, the system denies the user permission to write (upload) the data parts to the storage nodes.

Data Conflict Handling Logic

In some embodiments, data conflicts are handled by writing another copy (conflicted copy) of a data part whose write permission was denied. This conflict handling logic has a benefit of minimizing the damage of a deadlock; If a user fails to remove its lock file for a specific file (e.g. due to network issue), then all edits to that file by other users can still be made. However, the edits will be saved as another conflicted copy. This overcomes the problem of a deadlock preventing a file from being edited. In some embodiments, each client device is configured to detect and clean lock files that are no longer in use. This process can be initiated periodically, every 24 hours for example.

Atomicity of the Lock and Unlock Operations

The locking/unlocking operations of some embodiments are not atomic. In addition, the verification phase of a client can occur simultaneously with lock placing phase or with the lock removal phase of another client.

API requests

The number of API requests required in the method of some embodiments is four. These calls are:

1. Uploading a user-specific lock file
2. Listing lock files
3. Downloading metadata (to check the version of the file)
4. Removing the client-specific lock file The first request corresponds to the first phase (lock placing phase). The second and third requests correspond to the second phase (verification phase). The fourth request corresponds to the third phase (lock-removal phase). The total number of API requests needed for all used clouds is number of used clouds×4. In some embodiments, these requests are run in parallel with one another through threading.

Time to Response

Time to Response (TTR) is the time between a client's request to write/modify a file and determining the status of this request based on the responses of the clouds' APIs. Essentially, this is the time consumed by the first and second phase of operation. The status of the request can be granted or denied. If a user receives a permission to write, the client device will start uploading the new part files to their respective clouds, overwriting the older parts. If, on the other hand, a client's request to modify a file is denied, the client device will create a new file (conflicted copy) and upload its parts to the respective clouds, without affecting the part of the original file. Thus, a client device will be able to start writing (uploading) part files to the clouds after the end of the second phases of operation or, in other words, after the TTR.

Since the operation of the algorithm can run in parallel, the TTR is roughly the same when tested with one, two and three public cloud providers. Thus, the methods and systems of some embodiments may be scaled to multi-cloud storage systems that utilize a large number of cloud providers. Additionally, the TTR is approximately the same whether there is a data conflict between any number of clients or there is no conflict, which means that the method can also be scaled.

Cloud Storage Service Outage and Data Consistency

The methods and systems of some embodiments are configured to operate even if the available cloud storage nodes are not the same for a plurality of users but they overlap in at least one cloud storage node. For example, if for a client A only the two clouds C1, C2 are available from the used three C1, C2 and C3. And for another client B, the available clouds are C2, C3. The data consistency is still guaranteed since they overlap in C2 where the processes relating to C2 are still able to perform all the required verifications.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A data storage method for storing a data file across a plurality of storage nodes, the method comprising:
    a) partitioning the data file into a plurality of data parts;
    b) selecting a data part of the plurality of data parts;
    c) generating a lock file corresponding to the data part, the lock file comprising an identifier which identifies the data part;
    d) selecting a storage node of the plurality of storage nodes;
    e) sending a lock file query to the storage node, the lock file query requesting the storage node to return a lock file query response which is indicative of whether or not the storage node already stores a lock file comprising an identifier which identifies the data part;
    f) receiving the lock file query response from the storage node and,
        if the lock file query response indicates that the storage node does not already store a lock file comprising an identifier which identifies the data part:
            uploading the lock file to the storage node;
            uploading the data part to the storage node; and
            sending a delete lock file instruction to the storage node to instruct the storage node to delete the lock file; or
        if the lock file query response indicates that the storage node already stores a lock file comprising an identifier which identifies the data part:
            modifying the data part to produce a conflicted data part; and
            uploading the conflicted data part to the storage node; and
    g) repeating b)-f) for each data part of the plurality of data parts until each storage node stores at least one data part or at least one conflicted data part.

2. The method of claim 1, wherein the method comprises: sending a version query to the storage node, the version query requesting the storage node to return a version query response which is indicative of the version of a data part stored by the storage node; and
receiving the version query response from the storage node and,
    if the version query response indicates that the storage node stores a newer version of the data part:
        modifying the data part to produce a conflicted data part; and
        uploading the conflicted data part to the storage node.

3. The method of claim 1, wherein each of the plurality of storage nodes is a cloud storage system.

4. The method of claim 3, wherein each cloud storage system is configured to store data without communicating with the other cloud storage systems.

5. The method of claim 3, wherein each cloud storage system is configured to store data without communicating with a central controller.

6. The method of claim 1, wherein the method comprises: uploading a different data part to each storage node; and using an erasure coding technique to encode the data parts that are stored by the storage nodes.

7. The method of claim 1, wherein the method comprises: partitioning the data file into a greater number of data parts than the number of storage nodes; and
uploading a group of the data parts to each storage node.

8. The method of claim 1, wherein the method comprises: encrypting each data part using an encryption key; and
sending portions of the encryption key to different storage nodes each storage node stores a different portion of the encryption key.

9. A data storage system comprising:
a client device which incorporates a processor and a memory, the memory storing executable instructions which, when executed by the processor, cause the client device to:
    a) partition a data file into a plurality of data parts;
    b) select a data part of the plurality of data parts;
    c) generate a lock file corresponding to the data part, the lock file comprising an identifier which identifies the data part;
    d) select a storage node of a plurality of storage nodes;
    e) send a lock file query to the storage node, the lock file query requesting the storage node to return a lock file query response which is indicative of whether or not the storage node already stores a lock file comprising an identifier which identifies the data part;
    f) receive the lock file query response from the storage node and,
        if the lock file query response indicates that the storage node does not already store a lock file comprising an identifier which identifies the data part:
            upload the lock file to the storage node;
            upload the data part to the storage node; and
            send a delete lock file instruction to the storage node to instruct the storage node to delete the lock file; or
        if the lock file query response indicates that the storage node already stores a lock file comprising an identifier which identifies the data part:
            modify the data part to produce a conflicted data part; and
            upload the conflicted data part to the storage node; and
    g) repeat b)-f) for each data part of the plurality of data parts until each storage node stores at least one data part or at least one conflicted data part.

10. The system of claim 9, wherein the memory stores executable instructions which, when executed by the processor, cause the client device to:
send a version query to the storage node, the version query requesting the storage node to return a version query response which is indicative of the version of a data part stored by the storage node; and
receive the version query response from the storage node and,
if the version query response indicates that the storage node stores an newer version of the data part:
modify the data part to produce a conflicted data part; and
upload the conflicted data part to the storage node.

11. The system of claim 9, wherein each of the plurality of storage nodes is a cloud storage system.

12. The system of claim 11, wherein each cloud storage system is configured to store data without communicating with the other cloud storage systems.

13. The system of claim 11, wherein each cloud storage system is configured to store data without communicating with a central controller.

14. The system of claim 9, wherein the memory stores executable instructions which, when executed by the processor, cause the client device to:
upload a different data part to each storage node; and
use an erasure coding technique to encode the data parts that are stored by the storage nodes.

15. The system of claim 9, wherein the memory stores executable instructions which, when executed by the processor, cause the client device to:
partition the data file into a greater number of data parts than the number of storage nodes; and
upload a group of the data parts to each storage node.

16. A computer-readable medium storing executable instructions which, when executed by a computing device, cause the computing device to:
a) partition a data file into a plurality of data parts;
b) select a data part of the plurality of data parts;
c) generate a lock file corresponding to the data part, the lock file comprising an identifier which identifies the data part;
d) select a storage node of a plurality of storage nodes;
e) send a lock file query to the storage node, the lock file query requesting the storage node to return a lock file query response which is indicative of whether or not the storage node already stores a lock file comprising an identifier which identifies the data part;
f) receive the lock file query response from the storage node and,
if the lock file query response indicates that the storage node does not already store a lock file comprising an identifier which identifies the data part:
upload the lock file to the storage node;
upload the data part to the storage node; and
send a delete lock file instruction to the storage node to instruct the storage node to delete the lock file; or
if the lock file query response indicates that the storage node already stores a lock file comprising an identifier which identifies the data part:
modify the data part to produce a conflicted data part; and
upload the conflicted data part to the storage node; and
g) repeat b)-f) for each data part of the plurality of data parts until each storage node stores at least one data part or at least one conflicted data part.

17. The computer-readable medium of claim 16, wherein the computer-readable medium stores executable instructions which, when executed by a computing device, cause the computing device to:
send a version query to the storage node, the version query requesting the storage node to return a version query response which is indicative of the version of a data part stored by the storage node; and
receive the version query response from the storage node and,
if the version query response indicates that the storage node stores an newer version of the data part:
modify the data part to produce a conflicted data part; and
upload the conflicted data part to the storage node.

18. The computer-readable medium of claim 16, wherein each of the plurality of storage nodes is a cloud storage system.

19. The computer-readable medium of claim 16, wherein the computer-readable medium stores executable instructions which, when executed by a computing device, cause the computing device to:
upload a different data part to each storage node; and
use an erasure coding technique to encode the data parts that are stored by the storage nodes.

20. The computer-readable medium of claim 16, wherein the computer-readable medium stores executable instructions which, when executed by a computing device, cause the computing device to:
partition the data file into a greater number of data parts than the number of storage nodes; and
upload a group of the data parts to each storage node.

* * * * *